United States Patent
Shamis et al.

(10) Patent No.: US 11,082,493 B2
(45) Date of Patent: Aug. 3, 2021

(54) DISTRIBUTED MEMORY SYSTEM, DEVICE AND PROCESS

(71) Applicant: Arm Limited, Cambridge (GB)

(72) Inventors: Pavel Shamis, Austin, TX (US); Alejandro Rico Carro, Austin, TX (US)

(73) Assignee: Arm Limited, Cambridge (GB)

( * ) Notice: Subject to any disclaimer, the term of this patent is extended or adjusted under 35 U.S.C. 154(b) by 119 days.

(21) Appl. No.: 16/194,000

(22) Filed: Nov. 16, 2018

(65) Prior Publication Data

US 2020/0162549 A1 May 21, 2020

(51) Int. Cl.
*H04L 29/08* (2006.01)
*G06F 16/2455* (2019.01)
*G06F 16/901* (2019.01)
*G06F 16/22* (2019.01)

(52) U.S. Cl.
CPC ...... *H04L 67/1097* (2013.01); *G06F 16/2264* (2019.01); *G06F 16/2455* (2019.01); *G06F 16/9024* (2019.01)

(58) Field of Classification Search
CPC ............. H04L 67/1097; G06F 16/2455; G06F 16/9024; G06F 16/2264
See application file for complete search history.

(56) References Cited

U.S. PATENT DOCUMENTS

| | | | |
|---|---|---|---|
| 5,036,459 A | 7/1991 | De Haan et al. | |
| 7,818,757 B1 * | 10/2010 | Tsimelzon | G06F 9/546 709/231 |
| 2007/0156842 A1 * | 7/2007 | Vermeulen | H04L 29/06047 709/217 |
| 2009/0086746 A1 | 4/2009 | Kroeger et al. | |
| 2009/0327464 A1 | 12/2009 | Archer et al. | |
| 2012/0036514 A1 * | 2/2012 | Master | G06F 9/38 718/104 |
| 2014/0297833 A1 * | 10/2014 | Bedini | H04L 43/0876 709/224 |
| 2014/0324935 A1 * | 10/2014 | Zhang | G06F 11/0793 708/400 |
| 2015/0088958 A1 * | 3/2015 | Yasuda | H04L 67/303 709/201 |
| 2018/0276261 A1 * | 9/2018 | Smart | G06F 16/2246 |

(Continued)

OTHER PUBLICATIONS

McCune, "Thinking Like a Vertex: A Survey of Verted-Centric Frameworks for Large-Scale Distributed Graph Processing," ACM Computing Surveys, vol. 48, No. 2, Oct. 12, 2015, pp. 1-39.

(Continued)

*Primary Examiner* — Tonia L Dollinger
*Assistant Examiner* — Jihad K Boustany
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more mobile communication devices and/or processing devices to facilitate and/or support one or more operations and/or techniques for executing distributed memory operations. In particular, some embodiments are directed to techniques for the traversal of vertices of a data structure maintained in a distributed memory system.

21 Claims, 6 Drawing Sheets

(56) References Cited

U.S. PATENT DOCUMENTS

2020/0133663 A1* 4/2020 Dwars .................. G06F 8/75

OTHER PUBLICATIONS

Notification of Transmittal of the International Search Report and the Written Opinion of the International Searching Authority, or the Declaration, App. No. PCT/GB2019/053160, dated Feb. 4, 2020, 1 Page.
International Search Report, App. No. PCT/GB2019/053160, dated Feb. 4, 2020, 5 Pages.
Written Opinion of the International Searching Authority, App. No. PCT/GB2019/053160, dated Feb. 4, 2020, 10 Pages.
Buluc, el al., "Distributed-Memory Breadth-First Search on Massive Graphs", 1Computational Research Division, Lawrence Berkeley National Laboratory, Berkeley, USA, 2EECS Department, University of California, Berkeley, USA 3Computer Science & Engineering Department, The Pennsylvania State University, 2015, 22 pgs.
Notification Concerning Transmittal of International Preliminary Report on Patentability, App. No. PCT/GB2019/053160, dated May 27, 2021, 9 pages.

* cited by examiner

DISTRIBUTED MEMORY SYSTEM, DEVICE AND PROCESS

BACKGROUND

1. Field

The present disclosure relates generally to distributed memory systems.

2. Information

In a computing environment, a distributed memory may be implemented as a multiprocessor computer system in which each processing element maintains its own private memory. Computational tasks may then be executed on local data, and if remote data is required, a computational task may communicate with one or more remote processing elements. In a shared memory multiprocessor, on the other hand, a single memory space may be accessed by multiple processing elements.

SUMMARY

Briefly, particular implementations are directed to a first processing element comprising: a communication device for transmission of messages to a communication network and receipt of messages from the communication network; and one or more processors to: determine a current vertex to be traversed in a distributed memory operation, the current vertex being accessible via the first processing element, the current vertex being identified in a first message received at the communication device obtained at the one or more processors; and initiate transmission of a second message, responsive to traversal of the current vertex at the first processing element, through the communication device addressed to a second processing element requesting traversal of a subsequent vertex, the subsequent vertex being accessible via the second processing element.

Another particular implementation is directed to a method at a first processing element comprising: determining a current vertex to be traversed in a distributed memory operation, the current vertex being accessible via the first processing element, the current vertex being identified in a first message received at the first processing element; and transmitting, responsive to traversal of the current vertex at the first processing element, a second message addressed to a second processing element requesting traversal of a subsequent vertex in the distributed memory operation, the subsequent vertex being accessible via the second processing element.

Another particular implementation is directed to an article comprising: a non-transitory storage medium comprising computer-readable instructions stored thereon which are executable by one or more processors of a processing element to: determine a current vertex to be traversed in a distributed memory operon, the current vertex being accessible via the first processing element, the current vertex being identified in a first message received at the first processing element; and initiate transmission of a second message, responsive to traversal of the current vertex at the first processing element, addressed to a second processing element requesting traversal of a subsequent vertex, the subsequent vertex being accessible via the second processing element.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Figure 1A:
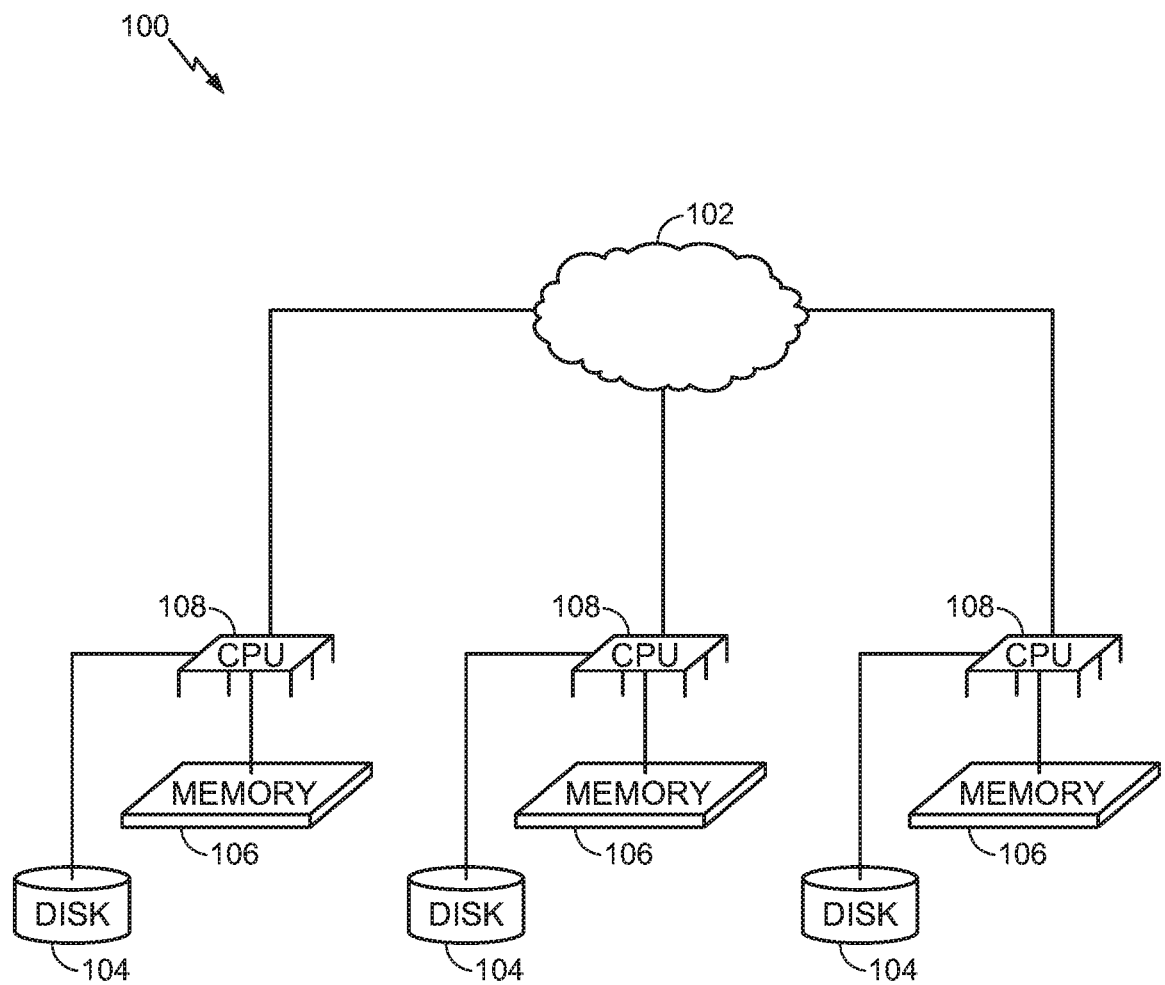
FIGS. 1A, 1B and 1C are schematic diagram illustrating features of distributed memory systems according to embodiments.

FIG. 1A is a schematic diagram illustrating features of a distributed memory system according to an embodiment. Here, processing elements may be coupled by a network 102 to exchange messages in relation to a distributed memory operation. In this context, a "distributed memory system" as referred to herein means a multiprocessor computer system in which individual processing elements maintain an associated private memory. In one example implementation, processing performed by an individual processing element in a distributed memory system may be limited to computational tasks on data locally stored in a private memory maintained by the individual processing element. The individual processing element, however, may access remote data items by communicating with other (e.g., remote) processing elements in the distributed memory system. In this context, a "distributed memory operation" as referred to herein means an operation facilitated between or among multiple processing elements in a distributed memory system comprising access of a private memory maintained at a first processing element for use in completion of a computing task initiated at a second processing element.

As shown in the particular illustrated implementation, a processing element in a distributed memory system 100 may comprise a corresponding central processing unit (CPU) 108 and one or more memory devices establishing a private memory accessible through the corresponding CPU 108. A processing element may comprise any one of several types of computing devices such as, for example, a personal computing device (e.g., smartphone or laptop computer), low power Internet-of-Things (IoT) device, enterprise computing node, just to provide a few examples. For simplicity, FIG. 1A shows three processing elements capable of communicating using messages transmitted through a network 102. It should be understood, however, that a distributed memory system may include only two such processing elements, or four or more such processing elements, and that claimed subject matter is not limited to a distributed memory system having any particular number of processing elements. As shown, a CPU 108 may maintain a memory on different types of physical devices such as disk 104 (e.g., magnetic memory storage devices) or integrated circuit memory 106 (e.g., DRAM, SRAM, non-volatile memories, etc.). Also, processing elements may be capable of transmitting message in and receiving messages from network 102 using any suitable transmission medium and network technology. It should be understood that features of a processing element in a distributed memory system as depicted herein are merely examples of how such a processing element may be implemented, and that claimed subject matter is not limited in this respect.

As pointed out above, a computing task to be completed by a processing element in a distributed memory system may utilize data accessible by a different processing element in a distributed memory operation (e.g., data item accessible by a private memory established by the different processing element). In some scenarios, a processing element may not have full awareness of locations in a distributed memory system where particular items of useful data may be maintained (e.g., private memories maintained and accessible by particular other processing elements in the distributed memory system). According to an embodiment, while a particular processing element in a distributed memory system may maintain a particular item of data in a private memory, the particular processing element may contact other processing elements in the distributed memory system to locate particular items of data that may be maintained by or accessible through the other processing elements.

In an embodiment, a data structure maintained in a distributed memory system may be implemented as a graph comprising "vertices" which are connected by "edges." For example, a vertex in such a graph may be associated with and/or comprising one or more data items of interest (e.g., as stored signals and/or states) while edges connecting vertices may be indicative of relationships between the vertices (or relationships between data items of the vertices). Such a graph may represent some relational data structure enabling a specific computing solution. In one example implementation, such a graph may represent individual people (e.g., by vertices) and relationships between or among the individual people (e.g., by edges) such as in a business organization or social network. In another example implementation, vertices of the graph may represent particles of a material and edges may represent relationships between or among the particles of the material. In an implementation, vertices may map to (e.g., and be accessible through) multiple processing elements to, for example, enable distribution of a large data structure that cannot practically reside on a single processing element, or enable parallel processing for real-time performance. In this context, a "traversal" as referred to herein means an event in which a processing element is engaged as part of a distributed memory operation in connection with a vertex. For example, a processing element may initiate or at least in part execute a distributed memory operation that traverses a vertex in the course of visiting, checking, contacting, exploring or otherwise accessing a resource associated with the vertex. Such traversal of a vertex may comprise, for example, retrieval of signals and/or states in a physical format (e.g., from a memory) embodying the vertex and processing the retrieved signals and/or states to provide resultant signals and/or states in a physical format. According to an embodiment, processing elements in a distributed memory system may initiate or execute a distributed memory operation where permitted traversal paths between or among vertices in a graph may be expressed as edges in the graph. In an example, an edge connected to a particular vertex may be expressed as another vertex that may be traversed immediately subsequent to traversal of the particular vertex.

Figures 1B, 1C:
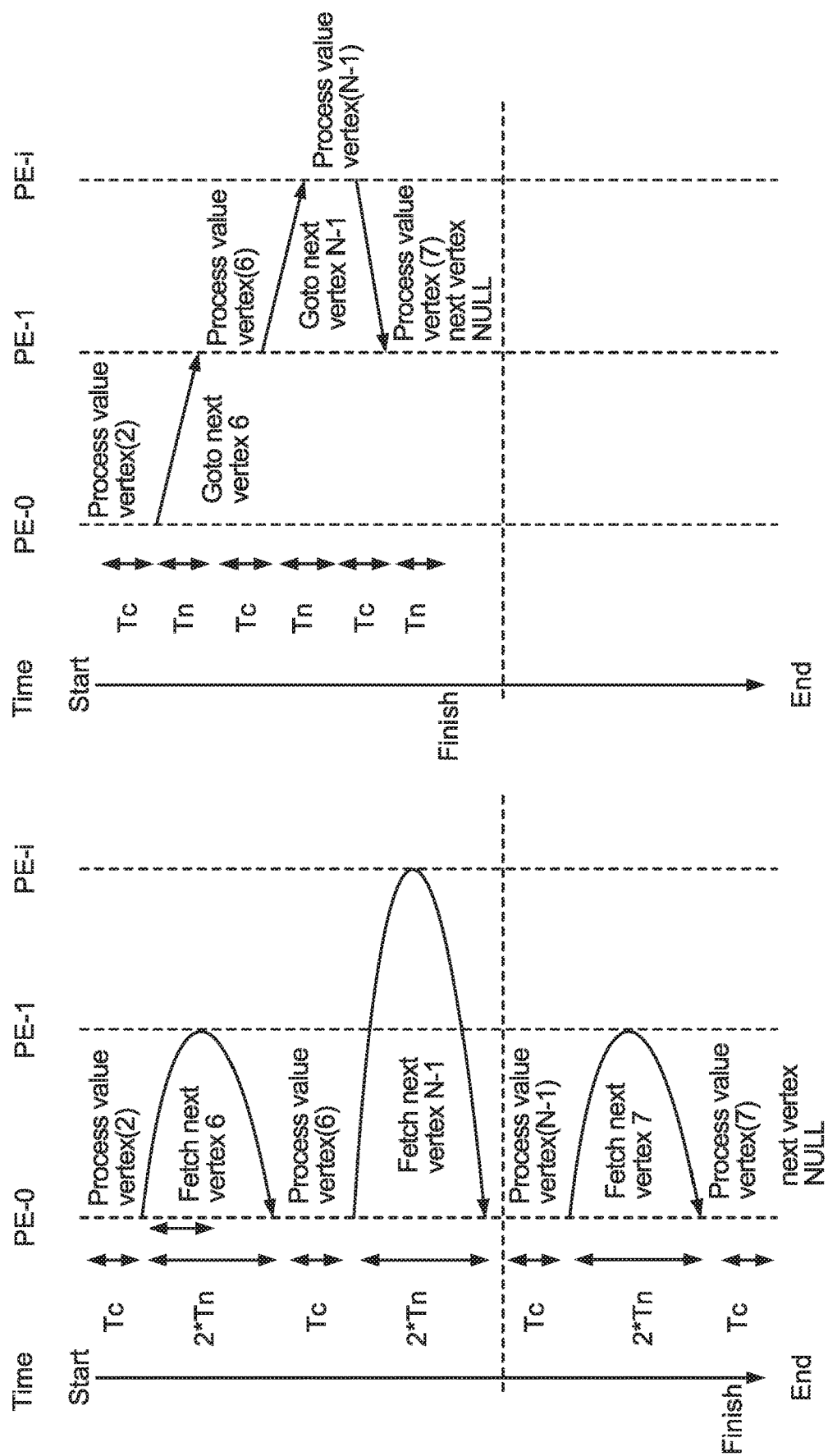

FIGS. 1B and 1C illustrate processes to traverse vertices of a graph representing a data structure maintained in a distributed memory system according to particular embodiments. In the embodiments of FIGS. 1B and 1C, processing elements PE-0, PE-1, . . . , PE-i coupled by network infrastructure (not shown) may form a distributed memory system. A computing task at processing element PE-0 may initiate a traversal of vertices accessible through other processing elements to locate one or more particular data items of interest, for example. Such a data item of interest may be accessible in a private memory maintained by one or more of the other processing elements in the distributed memory system. Traversal of vertices maintained in private memories accessible through processing elements PE-0, PE-1, . . . , PE-i may facilitate any one of several distributed memory operations such as, for example, an update, search, reduction, or compare operation that may make computations or decisions based on an accessed data item. In an example, a search operation may initiate execution of a compare operation at a processing element. Additional actions may be executed at the processing element responsive to results of the compare operation.

In the particular implementation of FIG. 1B, a computing task originating at processing element PE-0 may comprise access of data items in a data structure implemented as a graph in a distributed memory system accessible by processing elements PE-0, PE-1, . . . , PE-i. Here, vertices of a data structure implemented as a graph may be traversed exhaustively until a data item of interest is located. For example, a distributed memory operation initiated at processing element PE-0 may comprise a sequence of traversals of vertices accessible through processing elements PE-0, PE-1, . . . , PE-i one at a time by forwarding a message to one processing element, and awaiting a response from the one processing element before transmitting a subsequent message to a subsequent processing element for traversal of a subsequent vertex. For example, processing element PE-0 may transmit a first message to a first processing element to initiate traversal of a first vertex and wait for an acknowledgement message (e.g., with a result) from the first processing element before transmitting a second message to a second processing element to initiate traversal of a second vertex. Here, to traverse a vertex in the graph representing the data structure, processing element PE-0 may issue a remote memory read operation, which may entail a $2*T_n$ network latency where $T_n$ is a half round trip network latency for traversal of a single vertex (e.g., for transmitting an initial message to initiate the remote memory read operation and return of an acknowledgement message responsive to the initial message). In an example embodiment, a total time for an exhaustive traversal of N vertices in a distributed memory system may be modeled according to expression (1) as follows:

$$T_{overall} = N \times (2 \times T_n + T_C) + T_C, \quad (1)$$

where:

$T_C$ is an operation time on a fetched value.

In an alternative implementation of FIG. 1C, a distributed memory operation initiated at processing element PE-0 need not require receipt of an acknowledgment message at processing element PE-0 following completion of traversal of a particular vertex (e.g., through a different processing element) before traversal of a subsequent vertex commences. For example, processing element PE-0 may initiate traversal of an initial vertex by transmitting a first message to processing element PE-1. However, traversal of a subsequent vertex may be initiated by processing element PE-1 following traversal of the initial vertex without involvement from processing element PE-0. For example, in response to completion of transversal of the initial vertex at processing element PE-1, processing element PE-1 may transmit a message to a processing element PE-i initiating traversal of a subsequent vertex accessible via PE-i.

In the alternative approach illustrated in FIG. 1C, processing element PE-0 need not directly initiate traversals of all vertices in a distributed memory operation. For example, responsive to completion of traversal of an initial vertex through processing element PE-1, traversal of a subsequent vertex may be initiated by processing element PE-1 based, at least in part, on a result of the traversal of the initial vertex determined at processing element PE-1. Here, traversal of a subsequent vertex through processing element PE-i may be initiated by processing element PE-1 based on a result determined at processing element PE-1 and with no additional interaction with processing element PE-0. For example, responsive to an operation initiated by processing element PE-0, processing element PE-1 may perform an operation including an access of a private memory maintained at processing element PE-1. Based on this operation (or conditioned on this operation), processing element PE-1 may initiate subsequent traversals of vertices through other processing elements (without additional interaction with processing element PE-0). Thus, a total time for an exhaustive traversal of N vertices in a distributed memory system operating according to FIG. 1C may be modeled according to expression (2) as follows:

$$T_{overall} = N \times (T_n + T_C) + T_C. \quad (2)$$

Accordingly, use of the scheme illustrated in FIG. 1C enables a reduction in latency as compared to a latency (e.g., according to expression (1)) entailed with traversal according to the scheme illustrated in FIG. 1B.

According to an embodiment, executing a traversal of a vertex in a distributed memory operation may comprise a fetching of signals and/or states (e.g., implementing the vertex) from a memory locally maintained by a processing element (e.g., a processing element maintaining a vertex in a private memory) in support of or part of a desired operation. Based, at least in part, on a result of the desired operation (e.g., performed as part of a traversal of a current vertex such as by processing signals and/or states in a physical format fetched from a memory to provide resultant signals and/or states in a physical format), the processing element may trigger subsequent operations such as traversal of a subsequent vertex through another processing element. In an example, as discussed below, a processing element may trigger such operations to traverse a subsequent vertex by transmitting a message comprising a special request containing the following information: request initiator; a value (e.g., to compare to or reduce); a requested operation (e.g., compare or reduce); a vertex index to a processing element, just to provide a few examples.

Figure 2:
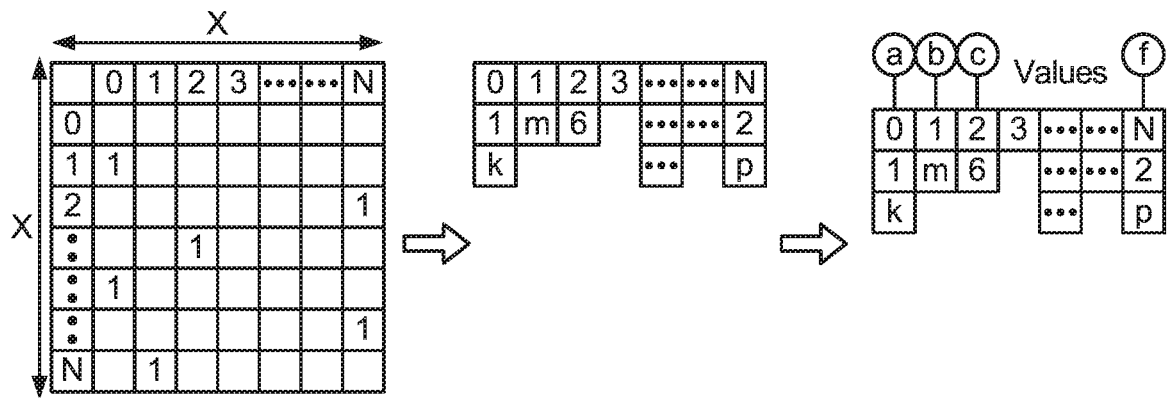
FIG. 2 is a diagram illustrating features of a transformation of a graphical representation according to an embodiment.
Figure 3:
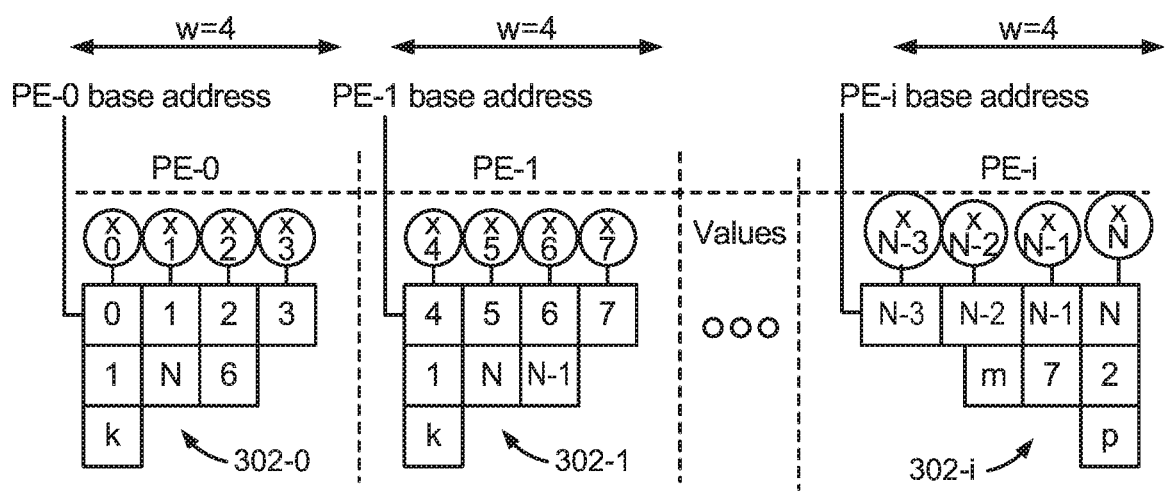
FIG. 3 is a schematic diagram of an addressing scheme implemented in processing elements of a distributed memory system according to an embodiment.

As pointed out above, a data structure maintained in a distributed memory system may be implemented as a graph comprising vertices associated with or implemented as signals and/or states (e.g., stored in a physical format in a memory) and edges to indicate possible or allowable traversal paths between vertices. FIGS. 2 and 3 depict representations of aspects of a graph representing a data structure maintained in a distributed memory system comprising processing elements PE-0 through PE-i. In FIG. 2, a two-dimensional matrix indicates edges, where a "1" in an entry for a particular (x,y) pair indicates a possible traversal of a vertex y immediately following traversal of a vertex x. As shown, this two-dimensional matrix may be transformed to a vector representation in which values in a column vector under a label 0, 1, 2, . . . N indicate vertices that may be traversed immediately following traversal of a vertex associated with label.

FIG. 3 illustrates an addressing scheme that may be implemented at processing elements according to an embodiment. As indicated above, a processing element in a distributed memory system may initiate traversals of vertices in a data structure maintained in the distributed memory system. Such vertices may be accessible for traversal by accessing private memories of other processing elements in the distributed memory system. FIG. 3 shows an addressing scheme to be applied by a particular processing element indicating particular vertices to which the particular processing element may initiate a traversal in a distributed memory operation. FIG. 3 illustrates that this addressing scheme may be expressed as an addressing array 302 which may be derived, at least in part, from the vector representation shown in FIG. 2.

As shown, a first row of an addressing array 302 of a particular processing element identifies four vertices accessible by the particular processing element. In an embodiment, the four vertices may be maintained in a private memory accessible by the particular processing element. In the presently illustrated embodiment, a distributed memory system comprises N+1 vertices associated with indices 0, 1, 2, . . . , N. In one example, an addressing scheme (as expressed by an addressing array 302-0) for processing element PE-0 shows that processing element PE-0 may execute a traversal of vertices associated with indices 0, 1, 2 and 3 (and storing values represented by variable names x0, x1, x2 and x3, respectively). An addressing scheme for processing element PE-1 shows that processing element PE-1 may execute a traversal of vertices associated with indices 4, 5, 6 and 7 (and storing values represented by variable names x4, x5, x6 and x7, respectively). An addressing scheme for processing element PE-i shows that processing element PE-i may execute a traversal of vertices associated with indices N−3, N−2, −1 and N (and storing values represented by variable names xN−3, xN−2, XN−1 and xN, respectively).

In the particular embodiment illustrated in FIGS. 2 and 3 as pointed out above, each vertex may be associated with an index (or identifier) mε0, 1, 2, . . . , N for N+1 vertices of a graph representing a data structure maintained in a distributed memory system. As shown in the addressing arrays 302 in FIG. 3, each processing element may maintain in a first row of its associated addressing array 302 four identifiers representing four vertices. As explained below, having addressing arrays 302 specify the same number of vertices may enable a particular addressing scheme. In the particular illustrated embodiment, each vertex may be traversed responsive to a message from exactly one processing element.

Following traversal of a particular vertex identified in a first row of an addressing array 302, additional vertices may be subsequently traversed to complete execution of a distributed memory operation. Entries in second and third rows below the particular processing element identified in the first row may represent "edges" to other vertices in the data structure that may be traversed immediately subsequent to traversal of the vertex identified in the first row. For example, entries in second and third rows under entry containing index "N" in a first row of addressing array 302-i indicates that immediately following traversal of vertex N, vertex 2 or vertex p may be traversed. Also, an entry in the second row under entry containing index "N−1" in the first row of addressing array 302-i indicates that immediately following traversal of vertex N−1, vertex 7 may be traversed. Similarly, an entry under entry containing "N−2" in the first row of addressing array 302-i indicates that immediately following traversal of vertex N−2, vertex m may be traversed. Also, an absence of an entry under entry containing "N−3" in the first row of addressing array 302-i indicates that no additional vertex may be traversed following traversal of vertex N−3.

According to an embodiment, an addressing array 302 may be locally stored or cached as signals and/or states in a private memory of a corresponding processing element. For example, addressing array 302-0 may be locally stored in a memory of processing element PE-0 to be accessed by processing element PE-0 to determine which vertices may be traversed immediately subsequent to traversal of a current vertex through processing element PE-0. Here, cached addressing array 302-0 may, in effect, identify w vertices, and associated connecting edges (e.g., from vertex 1 to vertex N and from vertex 2 to vertex 6 from values in a second or third row of addressing array 302-0) indicating vertices that may be traversed immediately subsequent traversal of a vertex identified in a first row of addressing array 302-0. In a particular implementation, entries of a first row of an addressing array 302 may be cached starting from a base address. According to an embodiment, a symmetric memory system may enable defining local addressing schemes to be the same for multiple processing elements in a distributed memory system. In such a symmetric memory system, a base address may be the same for memories of all processing elements. Here, for a particular processing element (e.g., network address) an address of a vertex index m may be computed according to expression (3) as follows:

$$PE_j = \left\lfloor \frac{m}{w} \right\rfloor \quad (3)$$

where $PE_j$ is a remote destination address for a memory partition maintained by processing element j in a distributed memory system.

A local address corresponding to a vertex index m within a memory local to a processing element j may be determined according to expression (4) as follows:

$$address_{local} = \text{base address} + m(\text{mod } w) \quad (4)$$

A global address corresponding to the vertex index m may be represented as a tuple of global address (e.g., determined according to expression (3)) and a local address (e.g., determined according to expression (4)) according to expression (5) as follows:

$$address_{global} = (PE_j, \text{base address} + m(\text{mod } w)) \quad (5)$$

Figure 4:
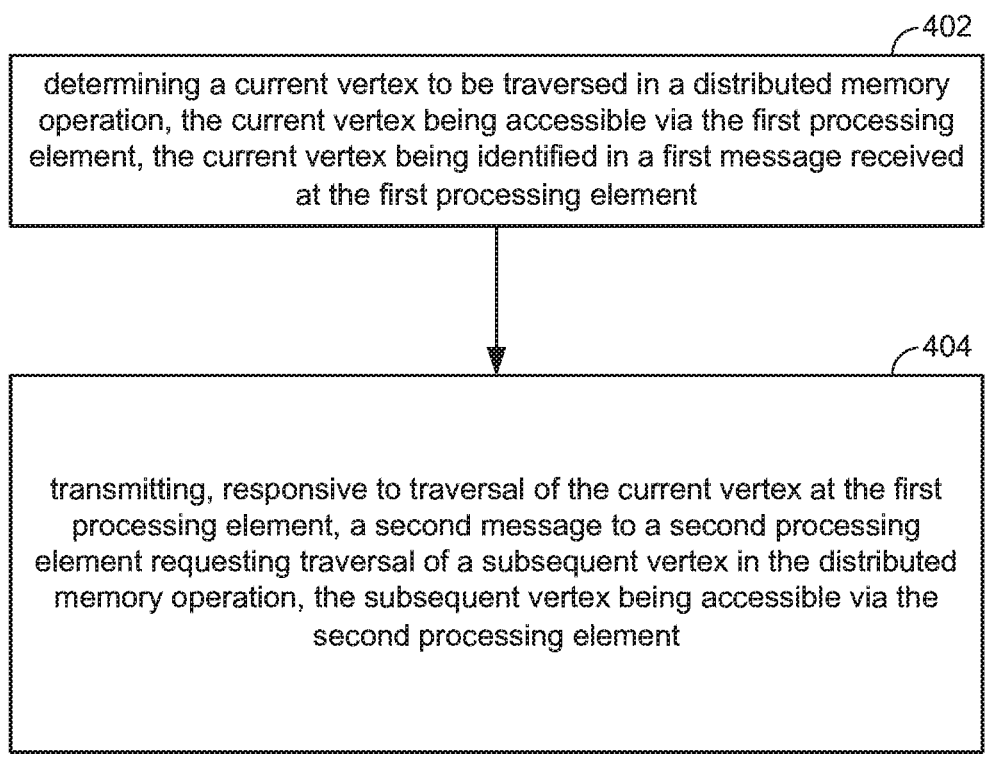
FIG. 4 is a flow diagram of an aspect of a process to traverse vertices in a distributed memory system in executing a distributed memory operation according to an embodiment.

FIG. 4 is a flow diagram of an aspect of a process to traverse vertices of a data structure maintained in a distributed memory system in the course of executing a distributed memory operation according to an embodiment. In one implementation, a first processing element in a distributed memory system may execute actions at blocks 402 and 404 in response to receipt of a first message. In an implementation, the first message may be transmitted by a processing element other than the first processing element. For example, the processing element other than the first processing element may transmit the first message responsive to initiation of the distributed memory operation at the processing element other than the first processing element. Alternatively, the processing element other than the first processing element may transmit the first message responsive to traversal of a previous vertex in the distributed memory operation occurring at the processing element other than the first processing element. In yet another alternative implementation, the first processing element may execute actions at block 402 and 404 in response to the first message being transmitted from the first processing element in a "loop back" transaction responsive to traversal of a previous vertex executed at the first processing element.

In the particular implementation as discussed above in connection with FIG. 1C, traversals of vertices in the course of a distributed memory operation may be initiated by a single processing element. Actions performed at blocks 402 and 404 by a first processing element, in an embodiment, may enable initiating a subsequent traversal of a vertex through a second processing element by transmission of a message by the first processing element. In one implementation, a processing element responding to traversal of a current vertex accessible through a local memory the first processing element may initiate traversal of a subsequent vertex conditioned on a computed result determined in the course of traversal of the current vertex. This may obviate any need for transmission and receipt of an acknowledgement message (e.g., transmission of an acknowledgement message upon completion of traversal of the current vertex and receipt of the acknowledgement message by a processing element initiating a distributed memory operation) before transmission of a message initiating traversal of the subsequent vertex.

In one implementation, blocks 402 and 404 may be performed by computing resources at a first processing element (e.g., CPU 108, memory 104 or memory 106) wherein the first processing element may be used to access a current vertex in a data structure maintained in a distributed memory system. In one aspect, blocks 402 and 404 may be performed by computing resources at the first processing element of the distributed memory system following or in response to traversal of a previous vertex executed by a processing element (such as the first processing element or a different processing element) in a distributed memory operation.

At block 402, a first processing element may determine a current vertex to be traversed in a distributed memory operation, wherein the current vertex is identified in a first message received by the first processing element. For example, block 402 may select a current vertex identified in a first row of the addressing array 302 based, at least in part, on an index value received in the first message. In an implementation, block 402 may select a current vertex at least in part by retrieving signals and/or states stored in a local memory accessible by the first processing element, and executing instructions to process the retrieved signals and/or states. The first processing element may then execute traversal of the selected current vertex. Such traversal of the current vertex may comprise any one of several operations such as, for example, locating a value, updating a value, returning a value, comparing a first value to a second value, just to provide a few examples. In one particular implementation, the first message received at block 402 may be transmitted by a processing element other than the first processing element. For example, the processing element other than the first processing element may initiate transmission of the first message responsive to transversal of a previous vertex in the distributed memory operation at the processing element other than the first processing element. In another implementation, the first message received at block 402 may have been transmitted by the first processing element in a "loop back" transaction in which the first processing element transmits (and receives) the first message responsive to transversal of a previous vertex in the distributed memory operation occurring at the first processing element.

The first processing element may also determine a subsequent vertex that is to be traversed immediately subsequent to traversal of the current vertex. For example, block 404 may select a subsequent vertex as being identified in a second or third row of the addressing array 302 in an entry below the first row entry associated with the current vertex.

Referring to the particular example of FIG. 3 discussed above, a first processing element comprising processing element PE-i executing block 402 may, according to addressing array 302-i, select a vertex from among vertices having identifiers N, N−1, N−2 or N−3 to determine a current vertex to be traversed. In one implementation, execution of blocks 402 and 404 may be initiated in response to receipt of the first message at the first processing element initiating traversal of the current vertex. Here, the first message received at the first processing element may identify the current vertex (e.g., using an index).

According to an embodiment, a first processing element at block 404 may determine a subsequent vertex to be traversed based, at least in part, on a computation executed at the first processing element (e.g., in the course of traversal of the current vertex). For example, such a subsequent vertex may be determined, at least in part, based on retrieval of signals and/or states (e.g., fetched from memory) implementing the current vertex and computation based on the retrieved signals and/or states to provide resultant signals and/or states in a physical format. In one embodiment, the subsequent vertex may be traversed in a distributed memory operation "immediately subsequent" to traversal of the current vertex. In this context, immediately subsequent means traversal of the subsequent vertex following traversal of the current vertex in a distributed memory operation, but before traversal of any other vertex in the distributed memory operation.

In some scenarios, for example, more than one edge may extend from a current vertex in a graph representing a data structure maintained in a distributed memory system. For example, the particular addressing array 302-i in FIG. 3 (accessible by processing element PE-i) shows that an edge may extend from vertex N to either vertex 2 or vertex p. Accordingly, processing element PE-i executing block 404 may further determine either vertex 2 or vertex p to be traversed immediately subsequent to traversal of vertex N at processing element PE-i. For example, processing element PE-i executing block 404 may select either vertex 2 or vertex p as a subsequent vertex based, at least in part, on a result of a computation completed at processing element PE-i in connection with traversal of vertex N.

Block 404 may comprise transmitting a message through a communication device (e.g., at the first processing element) addressed to a second processing element. The second message may identify a subsequent vertex that is to be traversed in a distributed memory operation immediately subsequent to traversal of the current vertex. Here, the second message transmitted at block 404 may be transmitted according to any one of several communication protocols over a communication network (e.g., network 102).

Figure 5:
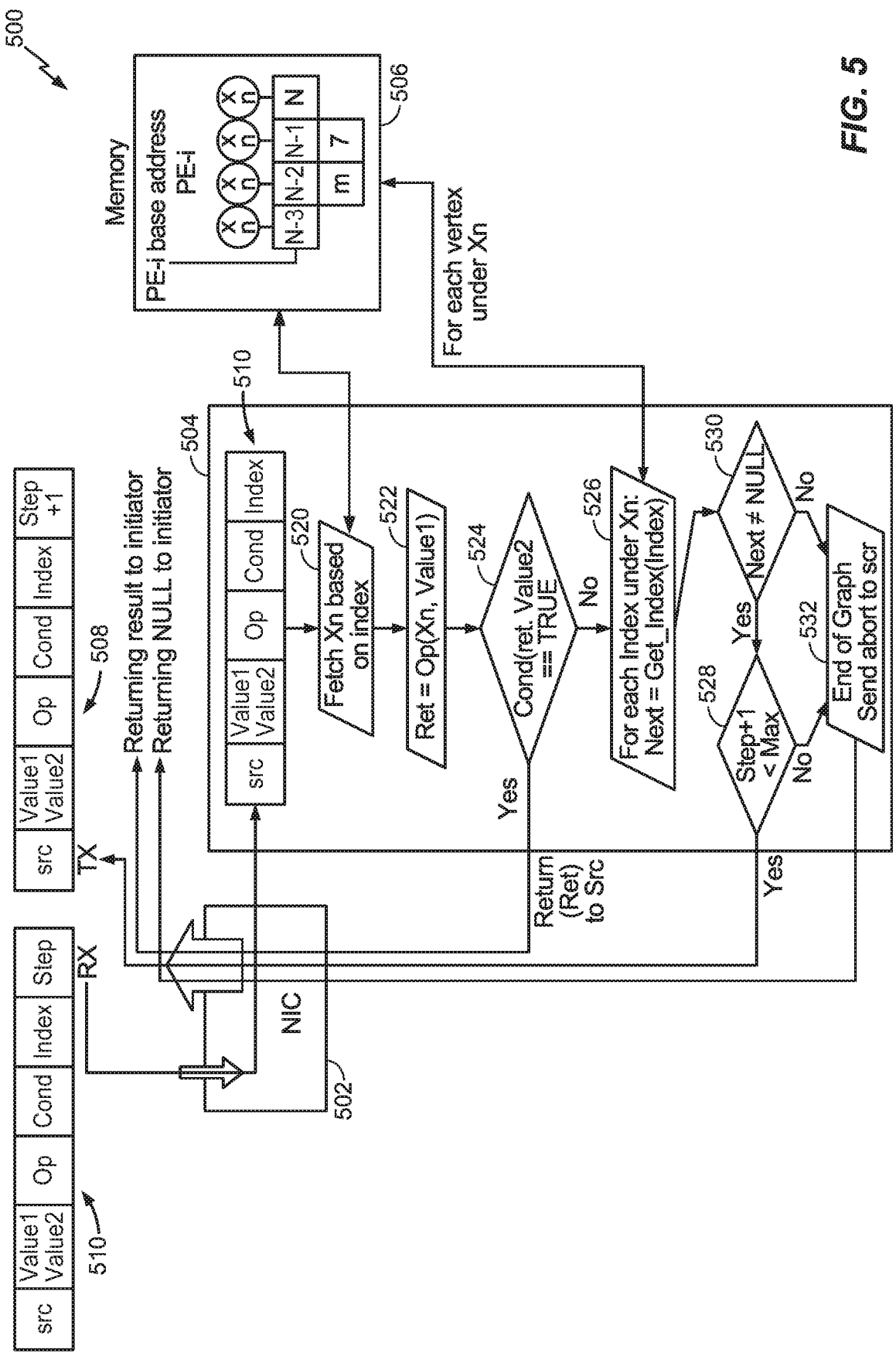
FIG. 5 is a schematic diagram of features to implement a process to execute an aspect of traversal of a vertex accessible by a processing element in a distributed memory system according to an embodiment.

FIG. 5 is a schematic diagram of features to implement a process to execute an aspect of traversal of a vertex of a graph representing a data structure maintained in a distributed memory system according to an embodiment. In one particular implementation, network interface controller (NIC) 502, graph accelerator processor 504 and memory 506 may be implemented in a processing element 500 of a distributed memory system, and may execute actions in blocks 402 and 404 discussed above, for example. According to an embodiment, graph accelerator processor 504 may comprise a core processor or microcontroller with load and store access to a memory hierarchy of local memory 506 (e.g., to retrieve or store signals and/or states in a physical format). Graph accelerator processor 504 may be configured as a pipeline processor to perform operations and comparisons as described below, and spawn atomic operations to occur at a cache or memory hierarchy to facilitate particular operations such as update of particular data items stored in memory 506.

In an implementation, NIC 502 may receive message 510 (e.g., from a previous processing element, not shown) and may transmit message 508 through a communication network having a suitable communication medium. Messages 508 and 510 as shown may be part of larger messages, frames and/or signal packets that are formatted for transmission through a suitable communication medium between devices according to a communication protocol. For example, fields for messages 508 and 510 may be encapsulated in frames and/or signal packets structured with additional fields (e.g., headers, preambles, error correcting codes, etc.) to facilitate reliable transmission in a transmission medium. A field "Src" may indicate an identifier and/or address of a processing element in a distributed memory system that has initiated traversal of one or more vertices as part of a distributed memory operation.

Based, at least in part, on a value in field "Index" of a received message 510, block 520 may fetch signals and/or states representing a value xn (e.g., a value x0, x1, x2, . . . , xN-3, xN-2, xN-1 or xN) in a physical format. Here, block 520 may access an addressing array (e.g., such as an addressing array 302 discussed above in connection with FIG. 3) stored as signals and/or states in memory 506 to obtain an identifier of a current vertex (e.g., a vertex having an identifier N-3, N-2, N-1 or N in a first row of an addressing array as shown) in a data structure maintained by the distributed memory system. In one example, a value stored as signals and/or states in field "Index" may comprise a value m (e.g., where m∈0, 1, 2, . . . , N) corresponding to a current vertex to be traversed at processing element 500 in a distributed memory operation. In an example, block 520 may fetch signals and/or states representing a value xN corresponding to the value in field "Index" according to an address local to memory 506 determined based, at least in part, on expression (3) discussed above, for example.

Processing at 522, 524 and 526 may be configured for pipeline processing, and may be executed optionally depending based, at least in part, on particular conditions such as a value provided in field "Op" of message 510. In one particular implementation, a value indicated in field "Op" of message 510 may indicate a particular distributed memory operation being performed such as, for example, a search operation, search and update operation or graph reduction operation, just to provide a few examples. In one embodiment, block 522 may optionally compute a value "Ret" according to a value indicated in field "Op" based, at least in part, on a value in field Value1 of message 510 and value Xn fetched by block 520. For example, a value "Ret" may comprise a value determined from a search or graph reduction operation specified by the value in field "Op." Diamond 524 may optionally return a value (e.g., computed at block 522) to the processing element indicated by the value in field "Src" of message 510 (e.g., the processing element initiating the distributed memory operation) responsive to a condition such as a comparison of a value in field "Value2" of message 510 and a value "Ret" determined by block 522. A value "Ret" may be provided to a processing element initiating a distributed memory operation (e.g., processing element associated with a value in field "Src" of message 510). Block 526 may comprise fetching signals and/or states in a physical format in memory 506 representing an index associated with a subsequent vertex that is to be traversed immediately subsequent to traversal of a current index. For example, block 526 may fetch from memory 506 signals and/or states implementing a value in a second row of the addressing array beneath the index value fetched by block 520 as an identifier of a subsequent vertex. For example, if block 520 fetches signals and/or states representing N-1 (in first row of addressing array) as xN-1 (based on the value in field "Index" in message 510), diamond 526 may fetch "7" (in second row of addressing array beneath N-1) as an identifier of a subsequent vertex to be traversed in a distributed memory operation.

If, on the other hand, block 520 fetches signals and/or states representing N (in first row of addressing array) as Xn (based on the value in field "Index" in message 510), there is no second row value beneath the value fetched by block 520, and diamond 530 may determine that there is to be no additional traversal in the distributed memory operation following traversal of the current vertex. Here, block 532 may initiate transmission of a message to the processing element initiating the distributed memory operation (e.g., addressed according to the identifier "Src") indicating that a terminal vertex in a data structure of the distributed memory system is being traversed. If a value in field "Step" or message 510 indicates that additional traversals are to be executed to complete a distributed memory operation as determined at diamond 528, a message 508 is to be transmitted to a second processing element (not shown) for traversal of a subsequent vertex accessible by the second processing element. Before initiating a message to initiate traversal of a subsequent vertex, diamond 528 may determine whether the value in field "Step"+1 exceeds a maximum number of permitted steps (e.g., to avoid potential loops). If, for example, the value in field "Step"+1 exceeds a maximum number of permitted steps or diamond 530 determines that there is to be no additional traversal, block 532 may initiate transmission of a message to the processing element initiating the distributed memory operation indicating an end of graph.

According to an embodiment, processing element 500 may execute traversal of a vertex as a part of any one of several different distributed memory operations including, for example, a graph search operation, a graph update and search operation or a graph reduction operation. In a graph search operation, for example, diamond 524 may detect a condition in which a particular data item has been located in memory 506 and initiate transmission of message to the processing element initiating the graph search operation containing the located data item. In a graph update and search operation, for example, in addition to detecting a condition in which a particular data item has been located in memory 506, diamond 524 may initiate an update of the located data item as stored in memory 506. In a graph reduction operation, for example, diamond 524 may compute one or more values to be returned in a message to the processing element initiating the graph reduction operation based, at least in part, on data items stored in memory 506.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples or traversal of vertices of a data structure maintained in a distributed memory system, for example, may be allocated among various devices, including one or more client devices, processing elements, one or more server devices and/or one or more peer-to-peer devices, via a computing and/or communications network, for example. A network may comprise two or more devices, such as network devices, processing elements and/or computing devices may couple devices, such as network devices, processing elements and/or computing devices, so that signal communications, such as in the form of signal packets and/or signal frames (e.g., comprising one or more signal samples), for example, may be exchanged, such as between a server device, processing element, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a processing element, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment. In one implementation, an electronic file and/or electronic document may comprise a vertex of a data structure in a distributed memory system that is maintained in a private memory of a processing element in a distributed memory system.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "vertex," "data item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. In another example, a vertex may be traversed in a distributed memory operation at least in part by retrieval of signals and/or states in a physical format comprising the vertex, and processing the retrieved signals and/or states (e.g., by a processor) to provide resultant signals and/or states in a physical format. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device, processing element and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a communication protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$, or 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 6:
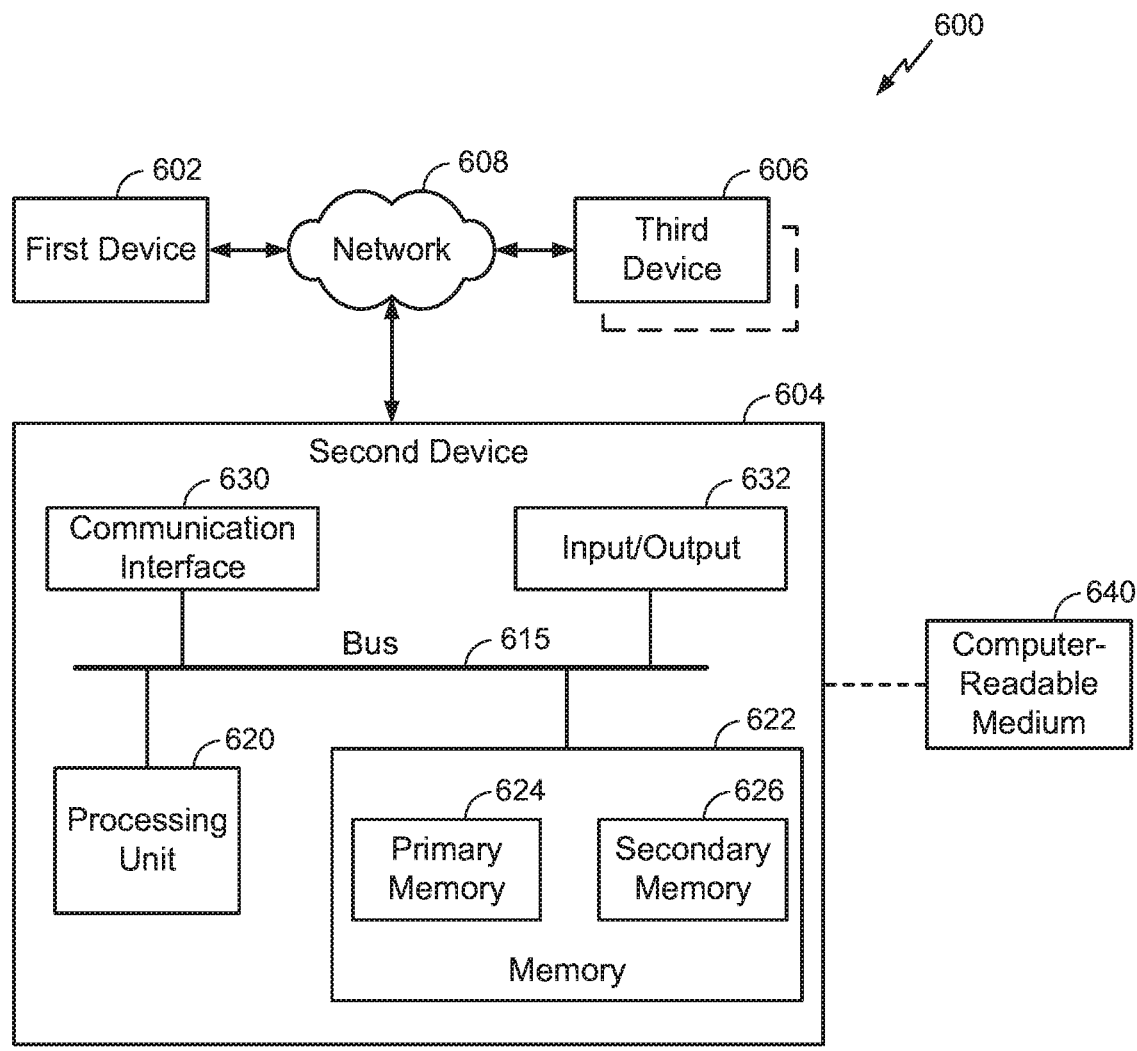
FIG. 6 is a schematic diagram illustrating an implementation of an example computing environment associated with a processing element.

In one example embodiment, as shown in FIG. 6, a system embodiment may comprise a local network (e.g., a second device 604 and a computer-readable medium 640) and/or another type of network, such as a computing and/or communications network. For purposes of illustration, therefore, FIG. 6 shows an embodiment 600 of a system that may be employed to implement either type or both types of networks, such as in connection with one or more operations and/or techniques for executing distributed memory operations. Network 608 may comprise one or more network connections, links, processes, services, applications, and/or resources to facilitate and/or support communications, such as an exchange of communication signals, for example, between a computing device, such as 602, and another computing device, such as 606, which may, for example, comprise one or more client computing devices, one or more processing elements and/or one or more server computing device. By way of example, but not limitation, network 608 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device, processing element and/or a server computing device, in an embodiment. It is further noted that the term computing device, in general, whether employed as a processing element, as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device," "processing element" and/or similar terms; however, if it is determined, for some reason not immediately apparent, that the foregoing understanding cannot stand and that 35 § USC 112 (f) therefore, necessarily is implicated by the use of the term "computing device," "processing element" and/or similar terms, then, it is intended, pursuant to that statutory section, that corresponding structure, material and/or acts for performing one or more functions be understood and be interpreted to be described at least in FIGS. 1-5.

As further illustrated in FIG. 6, in an embodiment, first and third devices 602 and 606 may be capable of rendering a graphical user interface (GUI) for a network device and/or a computing device, for example, so that a user-operator may engage in system use. Device 604 may potentially serve a similar function in this illustration. Likewise, in FIG. 6, computing device 602 ('first device' in figure) may interface with computing device 604 ('second device' in figure), which may, for example, also comprise features of a client computing device and/or a server computing device, in an embodiment. Processing device (e.g., processor or processing device) 620 and memory 622, which may comprise primary memory 624 and secondary memory 626, may communicate by way of a communication bus 615, for example. The term "computing device" or "processing element," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device or processing element, in the context of the present disclosure, may comprise hardware, software, firmware, or any combination thereof (other than software per se). Computing device 604, as depicted in FIG. 6, is merely one example, and claimed subject matter is not limited in scope to this particular example.

For one or more embodiments, a computing device or processing element may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may occur in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. As also discussed, a computing device and/or a networking device may also have other identities. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content)

may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 6, computing device 602 may provide one or more sources of executable computer instructions in the form physical states and/or signals (e.g., stored in memory states), for example. Computing device 602 may communicate with computing device 604 by way of a network connection, such as via network 608, for example. As previously mentioned, a connection, while physical, may not necessarily be tangible. Although computing device 604 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may be utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described. Thus, in some instances, processor 620 may facilitate and/or support, such as via a communication interface 630 (e.g., implementing NIC 502), for example, communicating electronically with a plurality of processing elements, such as to implement operations at blocks 402 and 404, at least in part. In addition, in at least one implementation, processor 620 may facilitate and/or support, for example, executing operations to traverse a vertex maintained in memory 622. Also, in some instances, processor 620 may facilitate and/or support, for example, executing actions performed by graph accelerator processor 504 as described above.

Memory 622 may store electronic files and/or electronic documents, such as relating to one or more users, and may also comprise a device-readable medium that may carry and/or make accessible content, including code and/or instructions, for example, executable by processor 620 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", "traversing", "accessing"; and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Continuing with FIG. 6, processor 620 may comprise one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, for example, so that signals and/or states may be appropriately communicated between devices, such as device 604 and an input device and/or device 604 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A first processing element comprising:
   a communication device for transmission of messages to a communication network and receipt of messages from the communication network, the communication network to comprise a distributed memory system comprising a plurality of individual processing elements to maintain associated local memories; and
   one or more processors to:
   determine a current vertex to be traversed in a distributed memory operation, the distributed memory operation to be executed at least in part by at least two of the individual processing elements, the current vertex to be accessible via a local memory maintained by the first processing element, the current vertex to be identified in a first message received at the communication device and obtained at the one or more processors;
   determine a subsequent vertex to be traversed based, at least in part, on a result determined in an operation executed in traversal of the current vertex; and
   initiate transmission of a second message, responsive to traversal of the current vertex at the first processing element, through the communication device addressed to a second processing element requesting traversal of the determined subsequent vertex, the subsequent vertex to be accessible via a local memory maintained by the second processing element.

2. The first processing element of claim 1, wherein the one or more processors are further to:
   initiate transmission of an acknowledgement message through the communication device to a processing element that initiated the distributed memory operation, the processing element that initiated the distributed memory operation to be other than the first processing element, the acknowledgement message to indicate completion of traversal of the current vertex.

3. The first processing element of claim 1, wherein the first message to be transmitted by a processing element other than a processing element that initiated the distributed memory operation.

4. The first processing element of claim 3, wherein the first message to be transmitted by the processing element other than the processing element that initiated the distributed memory operation responsive to traversal of a vertex at the processing element other than the processing element that initiated the distributed memory operation.

5. The first processing element of claim 1, wherein the one or more processors are further to determine the current vertex based, at least in part, on an index value in the first message.

6. The first processing element of claim 5, and wherein the one or more processors are further to:
   determine a local address in the local memory maintained by the first processing element based, at least in part, on the index value; and
   access an addressing array in the local memory maintained by the first processing element according to the local address to fetch signals and/or states representing an index of the subsequent vertex.

7. The first processing element of claim 1, wherein the operation executed in traversal of the current vertex to comprise execution of at least a portion of a graph search, graph search and update or a graph reduction operation, or a combination thereof, based, at least in part, on signals and/or states representing one or more values stored in the local memory maintained by the first processing element.

8. A method at a first processing element comprising:
   determining a current vertex to be traversed in a distributed memory operation, the distributed memory operation to be executed at least in part, by at least two individual processing elements of a distributed memory system, the current vertex being accessible via a local memory maintained by the first processing element, the current vertex being identified in a first message received at the first processing element;
   determining a subsequent vertex to be traversed based, at least in part, on a result determined in an operation executed in traversal of the current vertex; and
   transmitting, responsive to traversal of the current vertex at the first processing element, a second message addressed to a second processing element requesting traversal of a subsequent vertex in the distributed memory operation, the subsequent vertex being accessible via a local memory maintained by the second processing element.

9. The method of claim 8, and further comprising:
   transmitting an acknowledgement message through the communication device to a processing element that initiated the distributed memory operation, the processing element that initiated the distributed memory operation being different from the first processing element, the acknowledgement message indicating traversal of the current vertex.

10. The method of claim 9, wherein the first message is transmitted by a processing element other than the processing element that initiated the distributed memory operation.

11. The method of claim 10, wherein the first message is transmitted by the processing element other than the processing element that initiated the distributed memory operation responsive to completion of traversal of a vertex by the processing element other than the processing element that initiated the distributed memory operation.

12. The method of claim 10, and further comprising determining the current vertex based, at least in part, on an index value in the first message.

13. The method of claim 12, the method further comprising:
   determining a local address in the local memory maintained by the first processing element based, at least in part, on the index value; and
   accessing an addressing array in the local memory maintained by the first processing element according to the local address to fetch signals and/or states representing an index of the subsequent vertex.

14. The method of claim 13, and wherein the operation executed in traversal of the current index to comprise a graph search, graph search and update or a graph reduction operation, or a combination thereof, based, at least in part, on one or more data items stored in the local memory maintained by the first processing element.

15. An article comprising:
    a non-transitory storage medium comprising computer-readable instructions stored thereon which are executable by one or more processors of a first processing element to:
    determine a current vertex to be traversed in a distributed memory operation, the distributed memory operation to be executed at least in part by at least two individual processing units of a distributed processing system, the current vertex to be accessible via, a local memory maintained by the first processing element; the current vertex to be identified in a first message received at the first processing element;
    determine a subsequent vertex to be traversed based, at least in part, on a result determined in an operation executed in traversal of the current vertex; and initiate transmission of a second message, responsive to traversal of the current vertex at the first processing element; addressed to a second processing element requesting traversal of the determined subsequent vertex, the subsequent vertex to be accessible via a local memory maintained by the second processing element.

16. The article of claim 15, wherein the instructions are further executable by the one or more processors to:
    initiate transmission of an acknowledgement message to a processing element that initiated the distributed memory operation, the processing element that initiated the distributed memory operation to be different from the first processing element, the acknowledgement message to indicate traversal of the current vertex.

17. The article of claim 16, wherein the first message is to be transmitted by a processing element other than the processing element that initiated the distributed memory operation.

18. The article of claim 17, wherein the first message is to be transmitted by the processing element other than the processing element that initiated the distributed memory operation responsive to completion of traversal of a vertex by the processing element other than the processing element that initiated the distributed memory operation.

19. The article of claim 17, wherein the instructions are further executable by the one or more processors to determine the current vertex based, at least in part, on an index value in the first message.

20. The article of claim 19, wherein the instructions are further executable by the one or more processors to:
    determine a local address in the local memory maintained by the first processing element based, at least in part, on the index value; and
    access an addressing array in the private local memory maintained by the first processing element according to the local address to fetch signals and/or states representing an index of the subsequent vertex.

21. The article of claim 15, wherein the operation executed in traversal of the current index to comprise a graph search, graph search and update or a graph reduction operation, or a combination thereof, based, at least in part, on one or more data items stored in the local memory maintained by the first processing element.

* * * * *